US012647914B2

(12) United States Patent
Shi et al.

(10) Patent No.: US 12,647,914 B2
(45) Date of Patent: Jun. 2, 2026

(54) METHODS AND SYSTEMS FOR INITIAL ACCESS IN ASYMMETRIC CARRIER AGGREGATION

(71) Applicant: ZTE Corporation, Shenzhen (CN)

(72) Inventors: Jing Shi, Shenzhen (CN); Xianghui Han, Shenzhen (CN); Shuaihua Kou, Shenzhen (CN); Wei Gou, Shenzhen (CN); Xing Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 18/533,933

(22) Filed: Dec. 8, 2023

(65) Prior Publication Data

US 2024/0179651 A1 May 30, 2024

Related U.S. Application Data

(63) Continuation of application No. PCT/CN2022/087585, filed on Apr. 19, 2022.

(51) Int. Cl.
| | |
|---|---|
| *H04W 56/00* | (2009.01) |
| *H04W 68/02* | (2009.01) |
| *H04W 72/1268* | (2023.01) |
| *H04W 74/0833* | (2024.01) |

(52) U.S. Cl.
CPC ....... *H04W 56/0015* (2013.01); *H04W 68/02* (2013.01); *H04W 72/1268* (2013.01); *H04W 74/0833* (2013.01)

(58) Field of Classification Search
CPC ............. H04W 56/0015; H04W 68/02; H04W 72/1268; H04W 74/0833; H04L 5/0048; H04B 7/06952
See application file for complete search history.

(56) References Cited

U.S. PATENT DOCUMENTS

| | | | | |
|---|---|---|---|---|
| 2011/0286411 A1* | 11/2011 | Kim | ..................... | H04L 5/0092 |
| | | | | 370/329 |
| 2012/0044921 A1* | 2/2012 | Chung | .................. | H04L 5/0053 |
| | | | | 370/338 |
| 2017/0171848 A1 | 6/2017 | Xu | | |
| 2017/0279580 A1* | 9/2017 | Chen | ..................... | H04L 5/0048 |

(Continued)

FOREIGN PATENT DOCUMENTS

| | | |
|---|---|---|
| CN | 105376035 A | 3/2016 |
| CN | 105491675 A | 4/2016 |

OTHER PUBLICATIONS

"Initial random access in asymmetric carrier aggregation; 3GPP TSG RAN WG1#57", Samsung; R1-091881, May 4, 2009 (Year: 2009).*

(Continued)

*Primary Examiner* — Abdullahi Ahmed
(74) *Attorney, Agent, or Firm* — Perkins Coie

(57) ABSTRACT

Methods and systems for techniques for initial access in asymmetric carrier aggregation are disclosed. In an implementation, a method of wireless communication includes performing, by a communication device, an initial access on one or more cell that include a first number of first direction carriers and a second number of second direction carriers, wherein the first number is larger than or equal to the second number; and performing, by the communication device, at least one of transmission or reception of a message associated with the initial access.

20 Claims, 5 Drawing Sheets

(56) References Cited

U.S. PATENT DOCUMENTS

| | | | |
|---|---|---|---|
| 2017/0332413 A1 | 11/2017 | Pelletier et al. | |
| 2019/0207656 A1 | 7/2019 | Åhlander et al. | |
| 2019/0223212 A1 | 7/2019 | Xiao et al. | |
| 2019/0364599 A1 | 11/2019 | Islam et al. | |
| 2022/0104280 A1 | 3/2022 | Yang et al. | |
| 2022/0191849 A1* | 6/2022 | Yoon .................. | H04W 72/044 |

OTHER PUBLICATIONS

Extended European Search Report from European Patent Application No. 22937753.6 dated Mar. 14, 2025 (18 pages).
International Search Report and Written Opinion for International Application No. PCT/CN2022/087585, mailed on Nov. 25, 2022 (7 pages).
Samsung, "Initial access in DL and UL of LTE-A with carrier aggregation," 3GPP TSG RAN WG1 #57bis, Los Angeles, USA, R1-092664, Jun. 29-Jul. 3, 2009, 4 pages.
Texas Instruments, "RACH Procedure for Asymmetric Carrier Aggregation," 3GPP TSG RAN WG1 #56, Athens, Greece, R1-090583, Feb. 9-13, 2009, 4 pages.
LG Electronics, "Initial Access Procedure in LTE-Advanced," 3GPP TSG RAN WG1 #55, Prague, Czech Republic, R1-084196, Nov. 10-14, 2008, 4 pages.

* cited by examiner

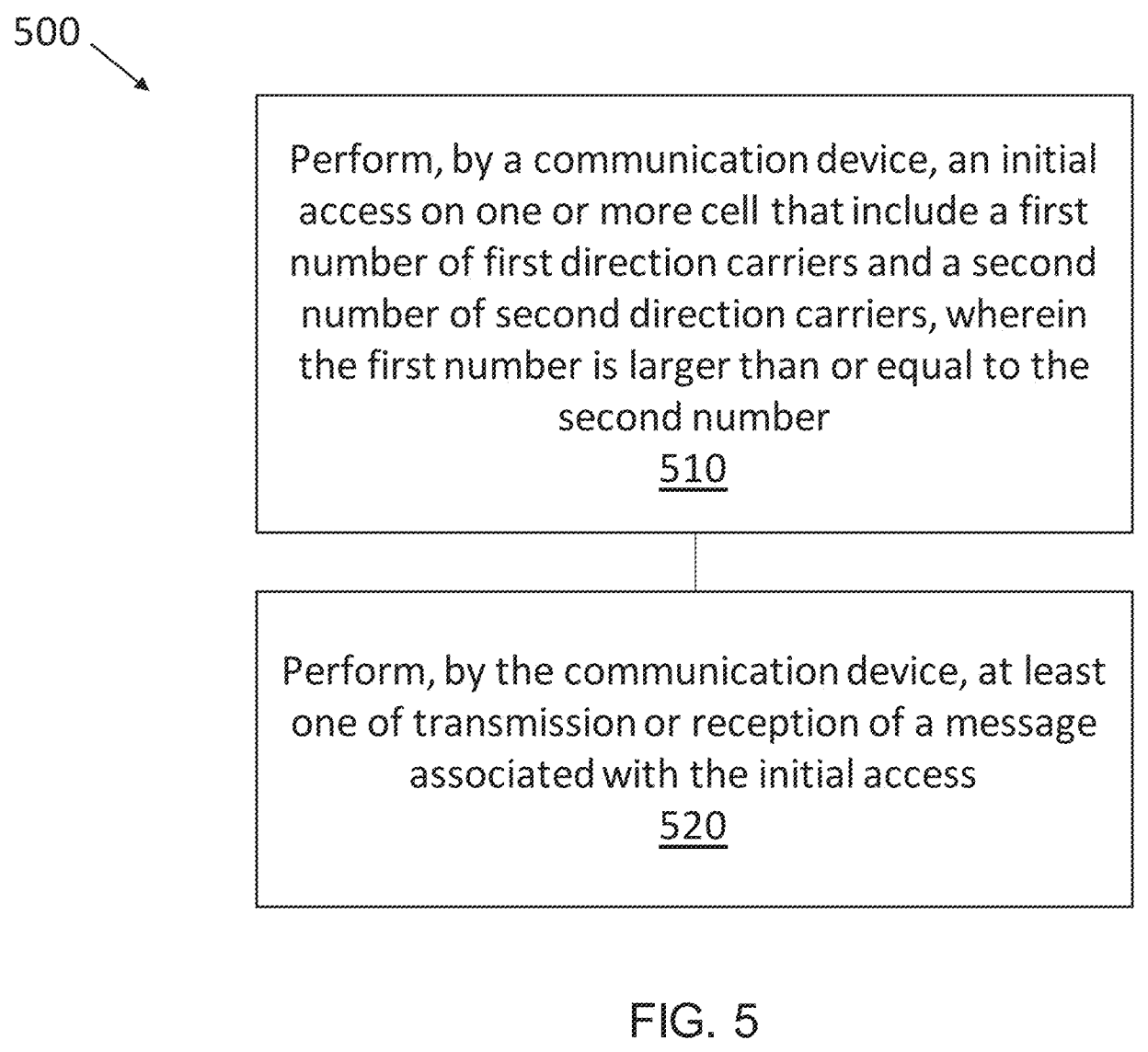

500

Perform, by a communication device, an initial access on one or more cell that include a first number of first direction carriers and a second number of second direction carriers, wherein the first number is larger than or equal to the second number
510

Perform, by the communication device, at least one of transmission or reception of a message associated with the initial access
520

FIG. 5

METHODS AND SYSTEMS FOR INITIAL ACCESS IN ASYMMETRIC CARRIER AGGREGATION

CROSS-REFERENCE TO RELATED APPLICATIONS

This application is a continuation of International Patent Application No. PCT/CN2022/087585, filed on Apr. 19, 2022, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for initial access in asymmetric carrier aggregation.

In one aspect, a method of data communication is disclosed. The method includes performing, by a communication device, an initial access on one or more cell that include a first number of first direction carriers and a second number of second direction carriers, wherein the first number is larger than or equal to the second number, and performing, by the communication device, at least one of transmission or reception of a message associated with the initial access.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWING

FIG. 5 shows an example of a process for wireless communication based on some example embodiments of the disclosed technology.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
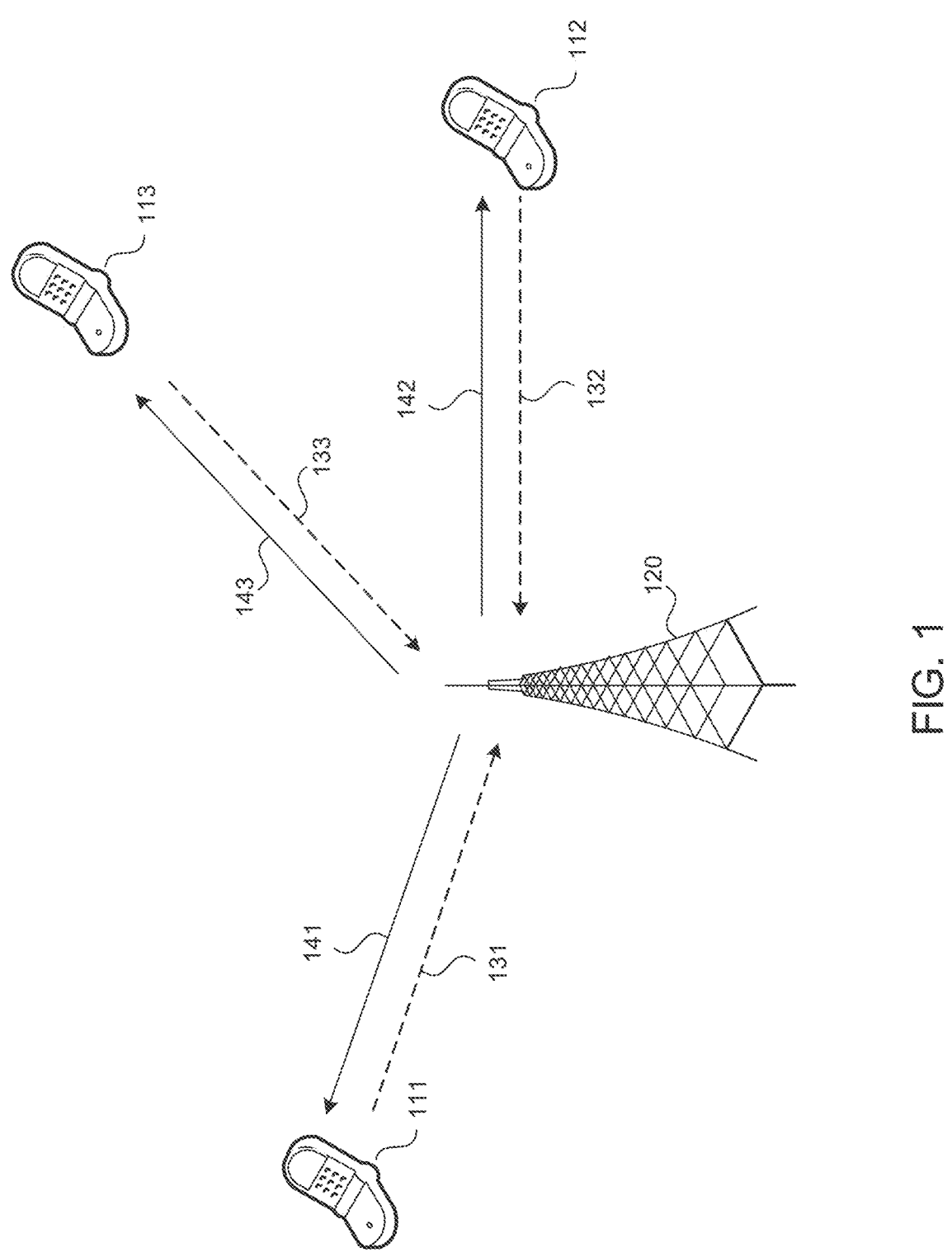
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
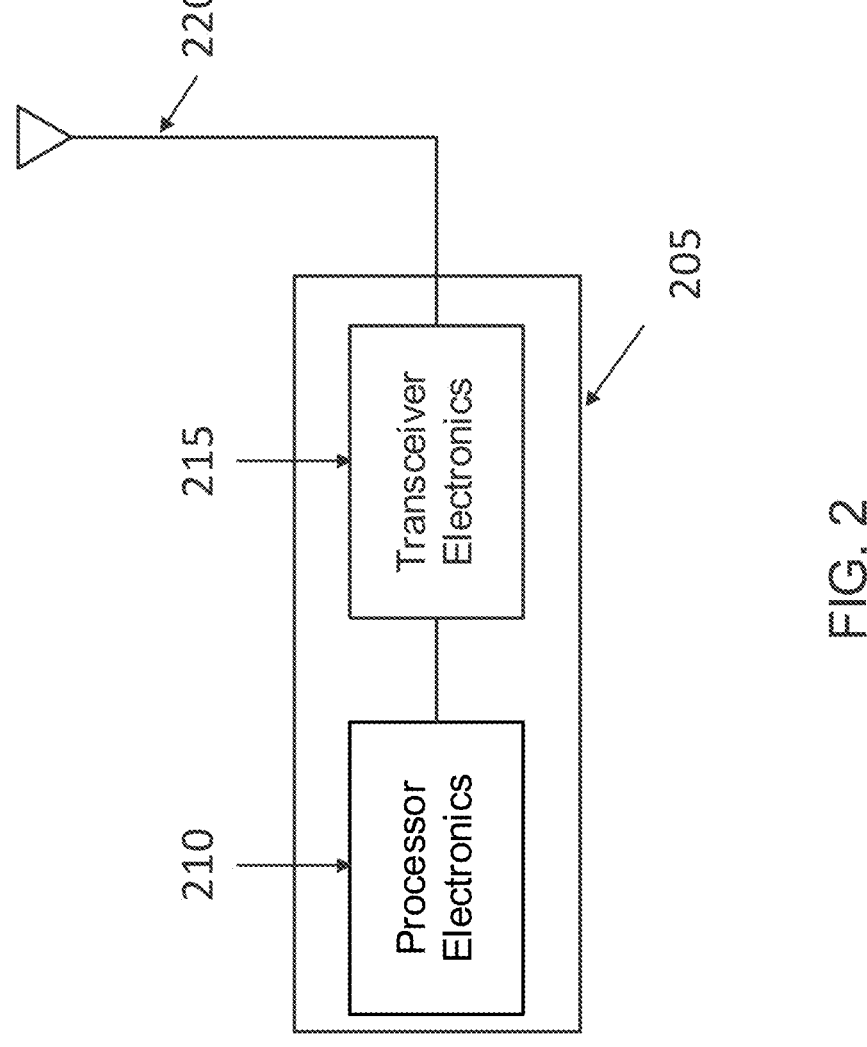
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems support features of enhanced mobile broadband (eMBB), ultra-reliable low-latency communication (URLLC), and massive machine-type communication (mMTC). In addition, full-duplex data transmission is a requirement for 5G and other communication systems.

In a wireless communication system, carrier aggregation can increase the data rate when there is no available resource on a single cell. For the traditional network traffic model, downlink (DL) traffic capacity is always larger than uplink (UL) traffic capacity. When carrier aggregation (CA) is used, one or more cells can be configured only with DL component carriers without any UL component carriers. With the enhanced requirement for systems that have a higher UL capacity than DL capacity, such as machine vision systems or video surveillance systems, an asymmetric CA is needed not only for DL heavy traffic scenario (more DL carriers than UL carriers), but also for UL heavy traffic scenario (more UL carriers than DL carriers). The disclosed technology can be implemented in some embodiments to perform initial access in an asymmetric CA scenario where the number of UL carriers is larger than the number of DL carriers. For example, the disclosed technology can be implemented in some embodiments to perform initial access in an asymmetric CA scenario where there is SCell without DL signals for network energy saving.

Figure 3:
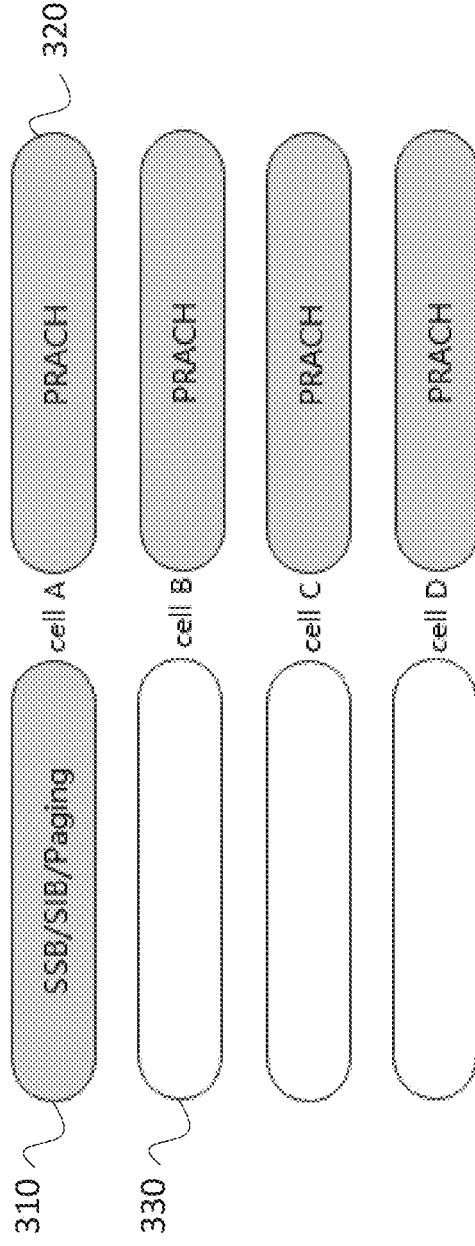
FIG. 3 shows an example of asymmetric carrier aggregation (CA) scenario based on some embodiments of the disclosed technology.

FIG. 3 shows an example of asymmetric carrier aggregation (CA) scenario based on some embodiments of the disclosed technology.

In a case that the number of UL carriers is larger than the number of DL, e.g., SCell without DL signals, which is beneficial for network energy saving, the disclosed technology can be implemented in some embodiments to perform initial access. The synchronization signal physical broadcast channel block (SSB) and/or system information block (SIB) and/or paging can be transmitted only on one cell and/or one carrier (e.g., 310), and a physical random access channel (PRACH) can be transmitted on one or more cells and/or one or more carriers (e.g., 320), as shown in FIG. 3. PRACH configurations on each cell and/or carrier are configured by SIB, which is transmitted only on one cell and/or one carrier. For other cells (e.g., 330) without SSB/SIB/Paging can be regarded as DL empty or phantom cell, or DL limited cell. In some implementations, DL limited cell can support all DL signals/channels, for example, a non-anchor cell can be only with SSB, while SIB and Paging are only supported on a single anchor cell. In this way, it is possible to avoid network power consumption for SSB/SIB/Paging transmissions and perform fast access from the camped cell to another cell supporting the intended service without HO/redirection/reselection.

There are two cases that PRACH can be transmitted on one or more cells and/or one or more carriers: In Case 1, a UE only choose one cell/carrier to send PRACH; In Case 2, a UE can choose multi-cell to send multi-PRACH. In some implementations, methods in different embodiments can be combined with each other.

Embodiment 1

For Case 2, a UE can choose multi-cell to send multi-PRACH to reduce access delay. It is beneficial for the inter-cell fast access and fast access to multiple initial BWPs if needed, e.g., different initial BWPs for different verticals.

PRACH or Msg1 transmission methods in Case 2 may include one of the following options: In Option 1, only UE may determine whether to transmit single PRACH on one cell/carrier or a plurality of PRACHs on a plurality of cells/carriers; In Option 2, gNB (and UE) may determine whether to transmit single PRACH on one cell/carrier or a plurality of PRACHs on a plurality of cells/carriers. gNB may configure a parameter for a UE to determine whether to transmit a single PRACH on one cell/carrier or a plurality of PRACHs on a plurality of cells/carriers; In Option 3, PRACH transmission pattern on a plurality of cells/carriers is used.

Option 1: only UE may determine whether to transmit single PRACH on one cell/carrier or a plurality of PRACHs on a plurality of cells/carriers. In some implementations, at least one of the following alternatives may be performed:

Alternative 1: UE will determine the cell(s)/carrier(s) based on implementations and requirements (e.g., high requirements for low access delay). For example, a UE selects N cells/carriers to send PRACH with higher requirement on low access delay (where N is a positive integer). For example, a UE selects one cell/carrier to send PRACH in a normal case.

Alternative 2: Different UE capabilities defined for different N values. A UE selects one of sets of N values supported by the UE, and Alternative 2 can be combined the methods discussed above. For example, 2 capabilities for N values, one is up to N=2, the other is up to N=4, if a UE reports N=4, then it can select up to 4 cells/carriers to send PRACH.

Option 2: gNB (and UE) may determine whether to transmit single PRACH on one cell/carrier or a plurality of PRACHs on a plurality of cells/carriers. gNB may configure a parameter for a UE to determine whether to transmit a single PRACH on one cell/carrier or a plurality of PRACHs on a plurality of cells/carriers. In some implementations, at least one of the following alternatives may be performed:

Alternative 1: The parameter may include a threshold value for UE reference, e.g., reference signal received power (RSRP)-threshold(s), quality of service (Qos) level(s), etc.

Alternative 2: The parameter may be used for a UE to determine the N value, one example is only to determine 1 or N, the other example is to determine one of set {N value}.

Alternative 3, The parameter may be used transmitted only on one cell or each cell. In one example, the parameter can be a parameter that is only delivered on anchor cell/carrier, not combined with each PRACH configuration for each cell/carrier. In another example, the parameter can be a parameter for each cell/carrier, e.g., combined with each cell/carrier PRACH configuration. In this example, whether or not the PRACH on each cell/carrier can be sent may be determined per cell/carrier for a UE.

Figure 4:
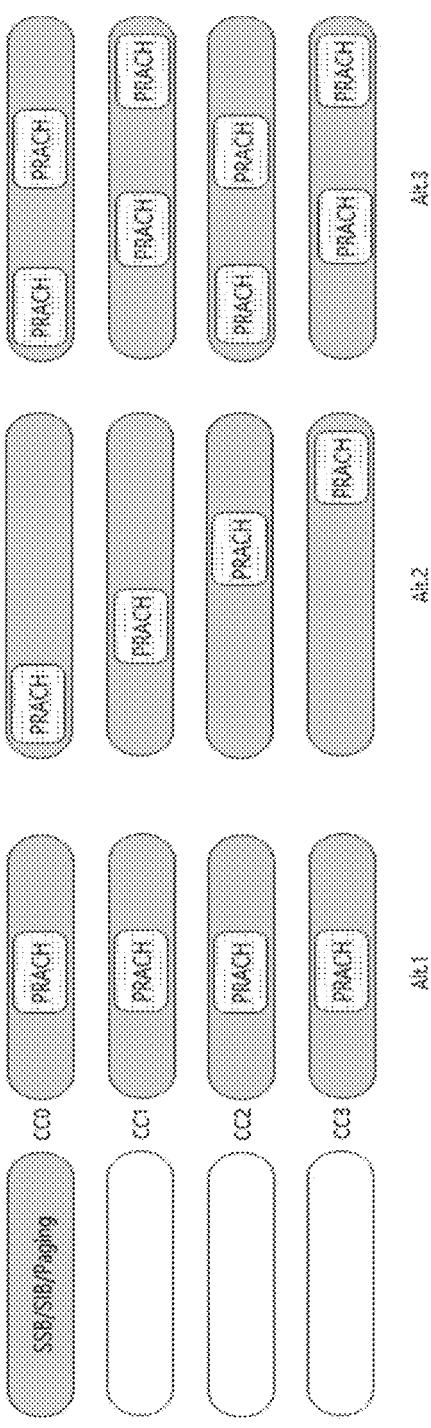
FIG. 4 shows an example of physical random access channel (PRACH) transmission pattern based on some embodiments of the disclosed technology.

FIG. 4 shows an example of physical random access channel (PRACH) transmission pattern based on some embodiments of the disclosed technology.

Option 3: PRACH transmission pattern on multi-cell/carrier. In some implementations, a plurality of PRACHs can be sent on N cells/carriers using a transmission pattern. Referring to FIG. 4, the transmission pattern may include one of the following alternatives:

Alternative 1: PRACH on multi-cells/carriers are transmitted on partial/all cells/carriers simultaneously. In some implementations, some patterns with different numbers of cells/carriers can be defined. For example, N can be several values for different patterns, that is, different patterns can be defined with multiple PRACH on different numbers of multi-cells/carriers.

Alternative 2: PRACHs on a plurality of cells and/or a plurality of carriers are transmitted on part or all of cells and/or part or all of carriers sequentially, e.g., one by one in time domain on each cell, thereby reducing the access delay in sending the next PRACH on another cell before the initial access. In addition, if at least one cell is a time division duplex (TDD) cell/carrier, the order of using cells/carriers can be determined by a frame structure, e.g., in a scenario wherein uplink (U) slots in CC0-CC3 are slot #5-9, slot #6-9, slot #7-9, slot #8-9, respectively, and then the pattern/order is CC0-CC3 using slot #5, #6, #7, #8 on each cell/carrier.

Alternative 3: Combine Alternative 1 and Alternative 2 to obtain a staggered pattern. For example, the pattern can be configured with {D_t, D_f} if needed, where D_t is the gap in time domain for the two PRACHs, optionally based on symbol/slot/frame, and D_f is the gap in frequency domain for the two PRACH, optionally based on RB/RBG/BWP/carrier/cell.

Alternatively, PRACH on another carrier/cell can be a retransmission/repetition of PRACH on an anchor carrier/cell. Optionally, PRACH transmissions on a plurality of cells and/or a plurality of carriers can be applied with a restriction that after a first repetition over maximum Rmax in time domain, repetitions of PRACHs are transmitted on a plurality of cells and/or a plurality of carriers.

In an implementation of the asymmetric CA, the number of UL carriers is larger than the number of DL carriers, that is, SCell without DL signals is beneficial for network energy saving. In the methods of Embodiment 1, a UE can choose a plurality of cells to send a plurality of PRACHs to reduce access delay. The SSB/SIB/Paging may be transmitted only on one cell/carrier, and PRACH can be transmitted on one or more cells and/or one or more carriers, thereby avoiding network power consumption in SSB/SIB/Paging transmissions and enabling fast access without HO/redirection/reselection.

Embodiment 2

The disclosed technology can be implemented in some embodiments to perform a random access response (RAR) or Msg2 based on SSB/SIB/Paging transmitted only on one/anchor cell/carrier and PRACH transmitted on one cell/carrier or a plurality of cells/carriers. There are two cases that PRACH can be transmitted on one or more cells and/or one or more carriers: In Case 1, a UE can only choose one cell/carrier to send PRACH; In Case 2, a UE can choose a plurality of cells to send a plurality of PRACHs. That is, no matter whether it is based on Case 1 or Case 2, RAR or Msg2 can be transmitted on an anchor cell/carrier or another cell if RPACH is transmitted on the other cell.

RAR or Msg2 transmission methods based on Case 1 or Case2 include one of the following operations: In Option 1, RAR is still transmitted on a cell that includes SSB/SIB/Paging, and in addition a single RAR can be used for any one cell, or a plurality of RARs can be used for a plurality of cells; In Option 2, RAR is transmitted on the cell on which the RPACH is transmitted, and similar to PRACH, SIB on an anchor cell/carrier can indicate the configuration on the other cell/carrier for RAR reception.

Method 1: In addition, for a single RAR that is transmitted on a cell/carrier based on the above Option 1 or Option 2, the cell that is used to transmit PRACH can be distinguished or identified as will be discussed below:

Alternative 1: Random access radio network temporary identifier (RA-RNTI) can be updated based on a cell identity (cell_id). For example, RA-RNTI=1+s_id+14× t_id+14×80×f_id+14×80×8×ul_carrier_id+14×80×8× 2×cell_id, or using the extended ul_carrier_id range to represent the multiple carriers/cells. As such, the RAR scheduled by the physical downlink control channel (PDCCH) with CRC scrambled RA-RATI may distinguish/identify the cell that transmits PRACH.

Alternative 2: Medium access control (MAC) control element (CE) can be updated with RAR UL grant including cell_id to distinguish or identify the cell that transmits PRACH, e.g., the cell_id can be similar to carrier indicator field (CIF). For example, using one or two or three bits in the current RAR UL grant to reinterpret the cell, and the cell is used for msg3 transmission, which also corresponds to the PRACH transmission. For example, the bits in the current RAR UL grant to reinterpret the cell can be the most significant bit (MSB) or the least significant bit (LSB) of modulation coding scheme (MCS), or MSB or LSB of resource allocation, etc.

Alternative 3: Using TDMed ra-ResponseWindow for different cells, or using different MOs in one ra-ResponseWindow for different cells. For example, in a case that a plurality of cells can be used for PRACH transmission, the PDCCH monitoring for RAR or msg2 for different cell/carrier can be time division multiplexed (TDMed) with different ra-ResponseWindows or different MOs in one ra-ResponseWindow for different cells, e.g., the CC #0-CC #3 may correspond to each one of consecutive RAR windows or MOs.

Alternative 4: Single RAR but there is no need to identify each PRACH cell/carrier, and Msg3 or the PUSCH scheduled by RAR UL grant can use one cell/carrier to transmit no matter whether it is Case1 or Case2 or use multi-cell/carrier to transmit in Case2. In some implementations, for Case 2, regardless of whether one UE uses the same preamble or different preambles on a plurality of cells. Alternatively, if PRACH on any cell is detected, then RAR is transmitted on the anchor cell (e.g., the cell including SSB/SIB) or any other cell (e.g., lowest cell index). Alternatively, the msg3 or the PUSCH scheduled by RAR UL grant is transmitted on the anchor cell (the cell including SSB/SIB) or any other cell (e.g., lowest cell index) or multi-cell/carrier corresponding to PRACH transmitted.

Method 2: In addition, in a case that a plurality of RARs for a plurality of cells/carriers are transmitted on a cell/carrier based on the above Option 1 or Option 2, the cell that transmits PRACH may be distinguished or identified as will be discussed below:

Alternative 1: MAC CE may include a plurality of RARs. Alternative 1 is simpler and can have more overhead. Alternatively, the plurality of RARs may be used by a plurality of UEs or by only a UE. In a case that only a UE uses the plurality of RARs, a plurality of PRACHs on a plurality of cells and/or a plurality of carriers for the same UE should be identified. In some implementations, a plurality of PRACHs of the same UE may be identified using some restrictions on a preamble transmission. For example, a preamble can be bundled or repeated, e.g., the same preamble on a plurality of cells, a predefined order of preambles on a plurality of cells.

Alternative 2: one RAR with a plurality of UL grants for each cell;

Alternative 3: one RAR with one UL grant for multi-cell msg3 or PUSCH scheduling.

Alternatively, for Alternative 1 to Alternative 3, the MAC sub-protocol data unit (PDU) is newly defined. For example, a plurality of RARs can be transmitted if a plurality of cells and a plurality of PRACHs from the same UE can be detected successfully or PRACHs on a plurality of cells and/or a plurality of carriers can be detected successfully regardless of whether it is from one UE or a plurality of UEs. If only one PRACH on one cell is detected, a fallback RAR is used.

In some implementations, the traditional RAR or a fallback RAR is included in a MAC sub-PDU with a subheader with an octet and a RAR with 7 octets. In one example, the subheader includes a Random Access Preamble ID field, which can be used to identify the transmitted Random Access Preamble. In another example, the RAR includes a timing advance command, UL grant and a temporary cell radio network temporary identifier (TC-RNTI).

Alternatively, the new MAC sub-PDU including a plurality of RARs may have a larger size. For Alternative 1, the size may include multiples of the fallback RAR, e.g., the size may be doubled in a case that a two-cell RAR is defined. For Alternative 2 and Alternative 3, the increased size is mainly from a UL grant field.

Alternatively, the new MAC sub-PDU including a sub-header with a field to identify the transmitted Random Access Preamble, which is used for a plurality of cells and/or a plurality of carriers. For example, the plurality of PRACHs of the same UE may be identified in this way. In one example, a preamble can be bundled or repeated, e.g., the same preamble on a plurality of cells, a predefined order of preambles on a plurality of cells.

Alternatively, for Alternative 2 and Alternative 3, they can also be referred to as mixed MAC RAR (e.g., one TA command+multiple UL grant for each cell/multi-cell scheduling UL grant+single TC-RNTI). In one example, one TA command is sufficient if a plurality of cells is in the same TAG, and X TA commands for X TAGs, e.g., X=2. In another example, one TC-RNTI or a plurality of TC-RNTIs can be both workable.

Alternatively, multi-RAR for multiple cells is valid in a case of different values of RA-RNTI, which is recalculated RA-RNTI (e.g., RA-RNTI=1+s_id+14×t_id+14×80×f_id+ 14×80×8×ul_carrier_id+14×80×8×2×cell_id). In a case that multi-RAR is used, one of the following alternatives can be used: in alternative 1, X LSB bits of RA-RNTI can be used, optionally in the same time domain, where X is integer. That is, multi-RAR includes multiple RA-RNTIs, which have the same X LSB bits of each RA-RNTI. In alternative 2, Y MSB bits of RA-RNTI can be used, optionally in different time domains, where X is integer. That is, multi-RAR includes multiple RA-RNTIs, which have the same X MSB bits of each RA-RNTI.

Alternatively, Msg3 transmission can be one of the following alternatives: in alternative 1, Msg3 is transmitted on the same cell as PRACH transmission. In alternative 2, one cell (case1 or case2) or a plurality of cells (case2) can be used to perform a transmission. In one example, the cell can be an anchor cell (e.g., a cell that includes SSB/SIB) or any other cells (e.g., cell with the lowest cell index) or a plurality of cells and/or a plurality of carriers corresponding to PRACH transmitted.

In an implementation of the asymmetric CA, the number of UL carriers is larger than the number of DL carriers, that is, SCell without DL signals which is beneficial for network energy saving. In the methods of Embodiment 2, Msg2 or RAR can also be transmitted on the anchor cell/carrier, which is aligned with the SSB/SIB/Paging transmitted only on one cell/carrier, while PRACH can be transmitted on one or more cells and/or one or more carriers, thereby avoiding network power consumption in SSB/SIB/Paging and RAR transmission and enabling fast access without HO/redirection/reselection.

Embodiment 3

The disclosed technology can be implemented in some embodiments to perform RAR or Msg2 based on SSB/SIB/Paging transmitted only on one cell/carrier or anchor cell/carrier and PRACH transmitted on one cell/carrier or a plurality of cells/carriers. There are two cases that PRACH can be transmitted on one or more cells and/or one or more carriers: In Case 1, a UE can only choose one cell/carrier to send PRACH; In Case 2, a UE can choose a plurality of cells to send a plurality of PRACHs. That is, no matter whether it is based on Case 1 or Case 2, similar to RAR or Msg2, Msg4 can be transmitted on an anchor cell/carrier or another cell if RPACH is transmitted on the other cell.

Msg4 transmission methods based on Case 1 or Case2 includes one of the following options: In Option 1, Msg4 is still transmitted on a cell that includes SSB/SIB/Paging or an anchor cell, and then dedicated RRC for another cell should be also delivered to UE on the anchor cell. Similar to RAR, a single Msg4 is for one cell, or multi-Msg4 is for multiple cells; In Option 2, Msg4 is transmitted on the cell on which the RPACH is transmitted, and similar to PRACH, SIB on an anchor cell/carrier can indicate the configuration on the other cell/carrier for Msg4 reception.

Method 1: In addition, for a single Msg4 that is transmitted on a cell/carrier based on the above Option 1 or Option 2, the cell sending PRACH is distinguished or identified as discussed in this embodiment. Msg4 is similar to the legacy message, which is only for one UE corresponding to one PRACH on one SCell.

Method 2: When a plurality of RARs for multi-cell and single TC-RNTI when multiple RARs are used, Msg4 transmission may include one of the following alternatives:

Alternative 1: Msg4 is only one TB which including one NAS_UE_ID for one UE corresponding to one PRACH on one SCell, or for one UE corresponding to multi-PRACH on multi-SCell. For case1, multiple PDCCH scheduling multiple msg4 are needed.

Alternative 2: Msg4 is only one TB with multi-code block group (CBG) with each CBG including one NAS_UE_ID for one UE corresponding to one PRACH on one cell.

Alternative 3: Msg4 is multi-TB which each TB corresponding to one UE to one PRACH on one cell. e.g., similar to multi-transmission time interval (TTI) scheduling in time domain.

For Alternative 1 to Alternative 3, an additional rule for determining C-RNTI for different UEs is needed (e.g., C-RNTI=TC-RNTI+i for each msg4, i=0, 1, . . . , N−1, N=maximum number of RAR/cells/carriers). When multiple TC-RNTIs in multi-RAR, Msg4 is only one TB (including one NAS_UE_ID) for one UE corresponding to one PRACH on one SCell. In one example, multiple PDCCHs scheduling multiple Msg4 are needed. Each TC-RNTI is used for a UE to determine C-RNTI.

Method 3: When multi-RAR for multiple cells and multiple TC-RNTIs in multi-RAR are used, Msg4 is only one TB including one NAS_UE_ID for one UE corresponding to one PRACH on one Cell. In one example, multiple PDCCHs scheduling multiple Msg4 are needed. Each TC-RNTI is used for a UE to determine C-RNTI.

In an implementation of the asymmetric CA, the number of UL carriers is larger than the number of DL carriers, that is, SCell without DL signals which is beneficial for network energy saving. In the methods of Embodiment 3, Msg4 can be also sent on the anchor cell/carrier, which is aligned with the SSB/SIB/Paging transmitted only on one cell/carrier, while PRACH can be transmitted on one or more cells and/or one or more carriers, thereby avoiding network power consumption in SSB/SIB/Paging and RAR transmission and enabling fast access without HO/redirection/reselection.

FIG. 5 shows an example of a process for wireless communication based on some example embodiments of the disclosed technology.

In some embodiments of the disclosed technology, a wireless communication method 500 includes, at 510, performing, by a communication device, an initial access on one or more cell that include a first number of first direction carriers and a second number of second direction carriers, wherein the first number is larger than or equal to the second number, and, at 520, performing, by the communication device, at least one of transmission or reception of a message associated with the initial access.

In some implementations, at least one of synchronization signal block (SSB), system information block (SIB), or paging is transmitted only on one cell or carrier, and one or more physical random access channels (PRACHs) are transmitted on one or more cells or carriers.

In some implementations, the communication device includes user equipment (UE).

In some implementations, the first direction carriers may include uplink carriers and the first direction carriers may include downlink uplink carriers.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: performing, by a communication device, an initial access on one or more cell that include a first number of first direction carriers and a second number of second direction carriers, wherein the first number is larger than or equal to the second number; and performing, by the communication device, at least one of transmission or reception of a message associated with the initial access.

In some implementations, the first direction carriers may include uplink carriers and the first direction carriers may include downlink uplink carriers.

Clause 2. The method of clause 1, wherein at least one of synchronization signal block (SSB), system information block (SIB), or paging is transmitted only on one cell or carrier, and one or more physical random access channels (PRACHs) are transmitted on one or more cells or carriers.

Clause 3. The method of clause 1, wherein the message includes at least one of: a first message transmitted by the communication device to a network device; a second message received by the communication device from the network device after transmitting the first message; a third message transmitted by the communication device to the network device after receiving the second message; and a fourth message received by the communication device from the network device after transmitting the third message.

Clause 4. The method of clause 3, wherein the first message includes one or more PRACHs, and wherein the communication device uses one cell or carrier to transmit a PRACH or is capable of using a plurality of cells or carriers to transmit a plurality of PRACHs.

Clause 5. The method of clause 4, wherein the communication device capable of using a plurality of cells or carriers to transmit a plurality of PRACHs determines whether to transmit one PRACH on one cell or carrier or a plurality of PRACHs on a plurality of cells or carriers.

Clause 6. The method of clause 5, wherein the communication device determines whether to transmit one PRACH on one cell or carrier or a plurality of PRACHs on a plurality of cells or carriers based on a parameter configured by the network device.

Clause 7. The method of clause 4, wherein the communication device capable of using a plurality of cells or carriers transmits a plurality of PRACHs on the plurality of cells or carriers based on a PRACH transmission pattern on multiple cells or carriers.

Clause 8. The method of clause 7, wherein the PRACH transmission pattern includes at least one of: simultaneous PRACH transmissions over part or all of the plurality of cells or carriers; sequential PRACH transmissions in time domain over the plurality of cells or carriers; or PRACH transmissions in a staggered manner over the plurality of cells or carriers.

Clause 9. The method of clause 3, wherein the second message includes one or more random access responses (RARs), and wherein the one or more RARs are transmitted on a cell or carrier that includes at least one of SSB, SIB, or paging, or the one or more RARs are transmitted on a cell that includes a corresponding PRACH transmission.

Clause 10. The method of any of clauses 9, wherein a single RAR transmitted corresponding to a cell carrying PRACH is identified using at least one of: a random access radio network temporary identifier (RA-RNTI) based on a cell identifier; a medium access control (MAC) RAR with uplink grant including a cell identifier; or different random access response windows or different monitoring occasions (MOs) in one random access response window.

Clause 11. The method of any of clauses 9, wherein multiple RARs are transmitted on one cell or carrier corresponding to two or more cells or carriers carrying the PRACH identified using at least one of: an MAC protocol data unit (PDU) that includes the multiple RARs corresponding to a plurality of cells or carriers, respectively; a single RAR with multiple uplink grants for each cell or for multi-cell physical uplink shared channel (PUSCH) scheduling; or a fallback RAR in a case that only one PRACH is detected on one cell.

Clause 12. The method of clause 3, wherein the third message includes a physical uplink shared channel (PUSCH), and wherein the PUSCH is transmitted on: a cell with a lowest index; a primary cell (PCell); a cell including at least one of SSB, SIB, or paging; a cell with a PRACH transmission identified; or part or all of the plurality of cells with the PRACHs transmission identified.

Clause 13. The method of clause 3, wherein the fourth message is carried by a physical downlink shared channel (PDSCH) that is transmitted on a cell that carries at least one of SSB, SIB, or paging or an anchor cell or a cell with a PRACH transmission identified.

Clause 14. The method of any of clauses 13, wherein, in a case that multiple RARs are transmitted corresponding to a plurality of cells or carriers with a single temporary cell radio network temporary identifier (TC-RNTI), the fourth message includes at least one of: a single transport block (TB) including one non-access-stratum user equipment identifier (NAS UE ID); a single TB with multiple code block groups (CBGs), each of which includes one NAS UE ID; or multiple TBs, each of which corresponds to one communication device and one PRACH on one cell.

Clause 15. The method of any of clauses 14, wherein different cell radio network temporary identifiers (C-RNTIs) for different communication devices is determined based on the single TC-RNTI.

Clause 16. The method of any of clauses 1-15, wherein the communication device includes user equipment (UE).

Clause 17. An apparatus for wireless communication comprising a processor that is configured to carry out the method of any of clauses 1 to 16.

Clause 18. A non-transitory computer readable medium having code stored thereon, the code when executed by a processor, causing the processor to implement a method recited in any of clauses 1 to 16.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
performing, by a communication device, an initial access on one cell or a plurality of cells that include a first number of first direction carriers and a second number of second direction carriers, wherein the first number is larger than or equal to the second number, wherein the first number corresponds to uplink carriers and the second number corresponds to downlink carriers; and
performing, by the communication device, at least one of:
transmitting, by the communication device, a first message to a network device, wherein the first message includes one or more physical random access channels, PRACHs;
receiving, by the communication device, a second message from the network device, wherein the second message includes one or more random access responses, RARs;
transmitting, by the communication device, a third message to the network device, wherein the third message is transmitted on a physical uplink shared channel, PUSCH; or
receiving, by the communication device, a fourth message from the network device, wherein the fourth message is received on a physical downlink shared channel, PDSCH.

2. The method of claim 1, wherein at least one of synchronization signal block (SSB), system information block (SIB), or paging is transmitted only on one cell or carrier, and one or more physical random access channels (PRACHs) are transmitted on one or more cells or carriers.

3. The method of claim 1, wherein in a case that the second message is received by the communication device from the network device, the second message is received after transmitting the first message; in a case that the third message is transmitted by the communication device to the network device, the third message is transmitted after receiving the second message; and in a case that the fourth message is received by the communication device from the network device, the fourth message is received after transmitting the third message.

4. The method of claim 3, wherein the communication device uses one cell or carrier to transmit a PRACH or is capable of using a plurality of cells or carriers to transmit a plurality of PRACHs.

5. The method of claim 4, wherein the communication device capable of using a plurality of cells or carriers to transmit a plurality of PRACHs determines whether to transmit one PRACH on one cell or carrier or a plurality of PRACHs on a plurality of cells or carriers.

6. The method of claim 5, wherein the communication device determines whether to transmit one PRACH on one cell or carrier or a plurality of PRACHs on a plurality of cells or carriers based on a parameter configured by the network device.

7. The method of claim 4, wherein the communication device capable of using a plurality of cells or carriers transmits a plurality of PRACHs on the plurality of cells or carriers based on a PRACH transmission pattern on multiple cells or carriers.

8. The method of claim 7, wherein the PRACH transmission pattern includes at least one of:
simultaneous PRACH transmissions over part or all of the plurality of cells or carriers;
sequential PRACH transmissions in time domain over the plurality of cells or carriers; or
PRACH transmissions in a staggered manner over the plurality of cells or carriers.

9. The method of claim 3, wherein the one or more RARs are transmitted on a cell or carrier that includes at least one of SSB, SIB, or paging, or the one or more RARs are transmitted on a cell that includes a corresponding PRACH transmission.

10. The method of claim 9, wherein a single RAR transmitted corresponding to a cell carrying PRACH is identified using at least one of:
a random access radio network temporary identifier (RA-RNTI) based on a cell identifier;
a medium access control (MAC) RAR with uplink grant including a cell identifier; or
different random access response windows or different monitoring occasions (MOs) in one random access response window.

11. The method of claim 9, wherein multiple RARs are transmitted on one cell or carrier corresponding to two or more cells or carriers carrying the PRACH identified using at least one of:
an MAC protocol data unit (PDU) that includes the multiple RARs corresponding to a plurality of cells or carriers, respectively;
a single RAR with multiple uplink grants for each cell or for multi-cell physical uplink shared channel (PUSCH) scheduling; or
a fallback RAR in a case that only one PRACH is detected on one cell.

12. The method of claim 3, wherein the PUSCH is transmitted on: a cell with a lowest index; a primary cell (PCell); a cell including at least one of SSB, SIB, or paging; a cell with a PRACH transmission identified; or part or all of a plurality of cells with PRACHs transmission identified.

13. The method of claim 3, wherein the physical downlink shared channel (PDSCH) is transmitted on a cell that carries at least one of SSB, SIB, or paging or an anchor cell or a cell with a PRACH transmission identified.

14. The method of claim 13, wherein, in a case that multiple RARs are transmitted corresponding to a plurality of cells or carriers with a single temporary cell radio network temporary identifier (TC-RNTI), the fourth message includes at least one of: a single transport block (TB) including one non-access-stratum user equipment identifier (NAS UE ID); a single TB with multiple code block groups (CBGs), each of which includes one NAS UE ID; or multiple TBs, each of which corresponds to one communication device and one PRACH on one cell.

15. The method of claim 14, wherein different cell radio network temporary identifiers (C-RNTIs) for different communication devices is determined based on the single TC-RNTI.

16. The method of claim 1, wherein the communication device includes user equipment (UE).

17. An apparatus for wireless communication comprising at least one processor that is configured to carry out a method, comprising:

performing, by a communication device, an initial access on one cell or a plurality of cells that include a first number of first direction carriers and a second number of second direction carriers, wherein the first number is larger than or equal to the second number, wherein the first number corresponds to uplink carriers and the second number corresponds to downlink carriers; and performing, by the communication device, at least one of:

transmitting, by the communication device, a first message to a network device, wherein the first message includes one or more physical random access channels, PRACHs;

receiving, by the communication device, a second message from the network device, wherein the second message includes one or more random access responses, RARs;

transmitting, by the communication device, a third message to the network device, wherein the third message is transmitted on a physical uplink shared channel, PUSCH; or receiving, by the communication device, a fourth message from the network device, wherein the fourth message is received on a physical downlink shared channel, PDSCH.

18. The apparatus of claim 17, wherein at least one of synchronization signal block (SSB), system information block (SIB), or paging is transmitted only on one cell or carrier, and one or more physical random access channels (PRACHs) are transmitted on one or more cells or carriers.

19. The apparatus of claim 17, wherein in a case that the second message is received by the communication device from the network device, the second message is received after transmitting the first message; in a case that the third message is transmitted by the communication device to the network device, the third message is transmitted after receiving the second message; and in a case that the fourth message received by the communication device from the network device, the fourth message is received after transmitting the third message.

20. The apparatus of claim 19, wherein:

the communication device uses one cell or carrier to transmit a PRACH or is capable of using a plurality of cells or carriers to transmit a plurality of PRACHs;

the one or more RARs are transmitted on a cell or carrier that includes at least one of SSB, SIB, or paging, or the one or more RARs are transmitted on a cell that includes a corresponding PRACH transmission;

the PUSCH is transmitted on: a cell with a lowest index; a primary cell (PCell); a cell including at least one of SSB, SIB, or paging; a cell with a PRACH transmission identified; or part or all of the plurality of cells with the PRACHs transmission identified; and the physical downlink shared channel (PDSCH) is transmitted on a cell that carries at least one of SSB, SIB, or paging or an anchor cell or a cell with a PRACH transmission identified.

* * * * *